(12) United States Patent
Davies et al.

(10) Patent No.: US 8,197,780 B2
(45) Date of Patent: Jun. 12, 2012

(54) METHOD OF PRODUCING A BORON SUBOXIDE MATERIAL

(75) Inventors: Geoffrey John Davies, Randburg (ZA); Iakovos Sigalas, Johannesburg (ZA); Mathias Herrmann, Coswig (DE); Thembinkosi Shabalala, Bergville (ZA)

(73) Assignee: Element Six (Production) (Pty) Ltd., Springs (ZA)

( * ) Notice: Subject to any disclaimer, the term of this patent is extended or adjusted under 35 U.S.C. 154(b) by 0 days.

(21) Appl. No.: 13/100,926

(22) Filed: May 4, 2011

(65) Prior Publication Data

US 2011/0203187 A1    Aug. 25, 2011

Related U.S. Application Data

(62) Division of application No. 12/065,955, filed as application No. PCT/IB2006/002456 on Sep. 6, 2006, now Pat. No. 7,955,579.

(30) Foreign Application Priority Data

Sep. 7, 2005 (ZA) ................. 2005/07180

(51) Int. Cl.
| | |
|---|---|
| C01B 35/10 | (2006.01) |
| C01B 15/12 | (2006.01) |
| C01B 35/12 | (2006.01) |
| B24D 3/02 | (2006.01) |
| C09C 1/38 | (2006.01) |
| C09K 3/14 | (2006.01) |
| B32B 9/04 | (2006.01) |
| C04B 35/03 | (2006.01) |
| C04B 35/00 | (2006.01) |
| C04B 35/48 | (2006.01) |
| C04B 35/49 | (2006.01) |

(52) U.S. Cl. ........... 423/278; 423/279; 51/307; 51/309; 428/704; 501/94; 501/96.1; 501/102; 501/108; 501/123; 501/127

(58) Field of Classification Search .................. 427/278, 427/279; 51/307, 309; 428/704; 501/94, 501/96.1, 102, 108, 123, 127; 423/278, 279
See application file for complete search history.

(56) References Cited

U.S. PATENT DOCUMENTS

| | | |
|---|---|---|
| 3,660,031 A | 5/1972 | Holcombe, Jr. et al. |
| 3,816,586 A | 6/1974 | Goosey |
| 5,135,892 A | 8/1992 | Ellison-Hayashi et al. |
| 5,330,937 A | 7/1994 | Ellison-Hayashi et al. |
| 5,366,526 A | 11/1994 | Ellison-Hayashi et al. |
| 5,456,735 A | 10/1995 | Ellison-Hayashi et al. |
| 2005/0022457 A1* | 2/2005 | Chen et al. ............ 51/307 |
| 2007/0234646 A1 | 10/2007 | Can et al. |
| 2010/0213247 A1 | 8/2010 | Egan et al. |

FOREIGN PATENT DOCUMENTS

| | | |
|---|---|---|
| EP | 0621327 A | 10/1994 |
| GB | 07103 A | 0/1911 |
| GB | 15757 A | 0/1914 |

OTHER PUBLICATIONS

Hubert, Herve et al.: "High-Pressure, High-Temperature Synthesis and Characterization of Boron Suboxide (B6O)", Chem. Mater., 1998, 10, pp. 1530-1537.
Sasai, R. et al.: 'High pressure consolidation of B6O-diamond mixtures', Journal of Materials Science, 36 (2001), pp. 5339-5343.
Itoh, H. et al.: 'Microstructure and mechanical properties of B6O-B4C sintered composites prepared under high pressure', Journal of Materials Science, 35 (2000) pp. 693-698.
Itoh Hideaki et al.: "High Pressure Sintering of B6O Powder and Properties of the Sintered Ccmpact", Material (J. Soc. Mat. Sci., Japan), vol. 47, No. 10, Oct. 1998, pp. 1000-1005 (The original article in Japanese appears behind the English translation of the article.).
Itoh, Hideaki et al.: "B6O-c-BN Composites Prepared by High-Pressure Sintering", J. Am. Ceram. Soc. 83 (3) (2000), pp. 501-506.

* cited by examiner

*Primary Examiner* — David M Brunsman
*Assistant Examiner* — Kevin Johnson
(74) *Attorney, Agent, or Firm* — Frommer Lawrence & Haug LLP; Ronald R. Santucci

(57) ABSTRACT

A method of producing a boron suboxide composite material having improved fracture toughness.

7 Claims, No Drawings

METHOD OF PRODUCING A BORON SUBOXIDE MATERIAL

CROSS REFERENCE TO RELATED APPLICATIONS

This application is a division of U.S. Pat. No. 7,955,579 issued Jun. 7, 2011 entitled "Boron Suboxide Composite Material" which is a 371 application of PCT/IB2006/002456 filed Sep. 6, 2006, published on Mar. 15, 2007 under publication number WO 2007/029102 A and claims priority benefits of South African Patent Application Number 2005/07180 filed Sep. 7, 2005, the disclosures of which are incorporated herein by reference.

BACKGROUND OF THE INVENTION

The invention relates to a boron suboxide composite and to a method for its preparation.

The first laboratory synthesis of diamond triggered extensive efforts to design and develop materials with a combination of properties approaching or even improving upon those of diamond. The best known of these superhard materials is cubic boron nitride (cBN). It is also known that boron rich compounds provide good candidates for this type of application. They give rise to a large family of refractory materials with unique crystal structures and a range of interesting physical and chemical properties related to their short interatomic bond lengths and their strongly covalent character. Boron rich phases with a structure based on that of α-rhombohedral boron include boron carbide and boron suboxide (nominally $B_6O$), which combine high hardness with low density and chemical inertness, making them useful as abrasives and for other high-wear applications [1].

The boron suboxide ($B_6O$) structure, space group $R\overline{3}m$, consists of eight $B_{12}$ icosahedral units situated at the vertices of a rhombohedral unit cell. The structure can be viewed as a distorted cubic close packing (ccp) of $B_{12}$ icosahedra. Two O atoms are located in the interstices along the [111] rhombohedral direction.

The synthesis of boron suboxide ($B_6O$) and a description of its properties have been extensively reported in the literature, even though pure material with a high degree of crystallinity is difficult to synthesize. Boron suboxide materials formed at or near ambient pressure are generally oxygen deficient ($B_6O_x$, x<0.9). They also have poor crystallinity and very small grain size. High pressure applied during the synthesis of $B_6O$ can significantly increase the crystallinity, oxygen stoichiometry, and crystal size of the products [1]. Although boron suboxide is reported as the nominal composition $B_6O$, it is widely accepted to be non-stoichiometric. For brevity, the nominal formula $B_6O$ is used in this specification.

In U.S. Pat. No. 3,660,031 a method of preparing boron suboxide is disclosed. According to this disclosure, the boron suboxide is formed by reducing zinc oxide with elemental boron at a temperature in the range of 1200° C. to 1500° C. It is reported as having the formula $B_7O$, and is also characterized as having an average hardness value of 38.20 GPa under a load of 100 g, and a density of 2.60 g/cm$^3$. The fracture toughness of this material is not reported.

U.S. Pat. No. 3,816,586 also discloses a method of fabricating boron suboxide. According to this disclosure, boron suboxide is formed by hot pressing the mixture of elemental boron and boron oxide at suitable temperatures and pressures. Upon analysis, the boron suboxide product is said to have given 80.1 wt. % boron and 19.9 wt. % oxygen which corresponds to the stoichiometry of $B_6O$. It is also reported as having a density of 2.60 g/cm$^3$ and a Knoop hardness under a 100 g load ($KNH_{100}$) of 30 GPa. The fracture toughness of this material is not reported.

A great deal of research has shown that while boron suboxide material has a very high hardness its fracture toughness is very low, i.e. the material is brittle. From the literature, Itoh et. al. [2], $B_6O$ compacts have been manufactured at high temperatures (1400° C.-1800° C.) and high pressures (3-6 GPa). This $B_6O$ powder is reported to have been synthesized from elemental boron and boric oxide. Upon analysis, the $B_6O$ compacts are reported as having an average hardness of 31-33 GPa and a very low fracture toughness. Itoh et. al. [3, 4] and Sasai et. al. [5], have also tried to improve the mechanical properties of $B_6O$, especially fracture toughness, using other hard materials like cBN [3], boron carbide [4], and diamond [5], respectively. The hardness for these $B_6O$ composites is respectable but the fracture toughness is reported to be still low, $B_6O$-diamond composites having a fracture toughness of about 1 MPa·m$^{0.5}$, $B_6O$-cBN composites having a fracture toughness of about 1.8 MPa·m$^{0.5}$ and $B_6O$—$B_4C$ composites having a fracture toughness of about 1 MPa·m$^{0.5}$.

It is an object of the present invention to provide a method of producing $B_6O$ composites with a respectable hardness as well as a better fracture toughness, compared to the previously reported $B_6O$ composites.

SUMMARY OF THE INVENTION

According to one aspect of the invention, there is provided a boron suboxide composite material comprising particulate or granular boron suboxide distributed in a binder phase comprising $M_xB_yO_z$, wherein M is a metal;
X is from 4 to 18;
Y is from 2 to 4;
Z is from 9 to 33.

The metal is preferably selected from the group comprising aluminium, zirconium, titanium, magnesium and gallium, in particular aluminium.

The boron suboxide preferably comprises greater than 70% by weight of the composite material, in particular from about 85 to about 97% by weight.

The binder phase preferably comprises less than about 30% of the composite material, in particular from about 3 to about 15% by weight.

The composite material of the invention preferably has a fracture toughness of greater than about 2.5 MPa·m$^{0.5}$.

According to another aspect of the invention, a method of producing a boron suboxide composite material includes the steps of providing a source of boron suboxide particles, preferably a powder, coating the boron suboxide particles with a metal or metal compound, preferably by chemical vapour deposition, and sintering the metal coated boron suboxide particles at a temperature and pressure suitable to produce a composite material.

The metal is preferably selected from the group comprising aluminium, zirconium, titanium, magnesium, and gallium, in particular aluminium, or compounds thereof. The sintering of the metal-coated boron suboxide particles is preferably carried out using a hot press, preferably at a temperature of greater than about 1600° C., in particular at a temperature of about 1900° C., and preferably at a pressure of less than about 300 MPa, in particular at a pressure of about 50 MPa.

An activator may be used during coating of the boron suboxide particles. For example, in the case of aluminium, ammonium chloride may be used as an activator during the coating of the boron suboxide particles.

DESCRIPTION OF THE EMBODIMENTS

The boron suboxide composite material of the present invention is made by hot pressing a metal-coated $B_6O$ powder at high temperatures and low pressures.

The starting $B_6O$ powder is coated with a metal, in this case aluminium, using a chemical vapor deposition (CVD) process, at moderately high temperatures. For example, aluminium (Al) powder is admixed with ammonium chloride ($NH_4Cl$) using a turbular mixer with alumina balls for several hours, typically 1.5 hours. Ammonium chloride is used as an activator during coating. As a large amount of aluminium may reduce $B_6O$ during coating, a very small amount of aluminium is admixed with ammonium chloride. After this admixing, the milled $B_6O$ powder is admixed with the mixture (Al/NH$_4$Cl), using alumina balls for several hours, typically 1.5 hours. The new mixture (B$_6$O/Al/NH$_4$Cl) is poured into an alumina boat, and alumina pebbles placed on top of the mixture. The alumina pebbles act as inert fillers and capture some of the gases being released in the furnace, which prevents the clogging of the exhaust pipe of the tube furnace. The alumina boats are then placed in the tube furnace, and heated up to about 1400° C., with a low heating rate.

This CVD process provides particles coated with Al—B—O compounds, in a homogeneous distribution. Although aluminium is described for convenience, it is to be understood that the process can also be carried out by coating the B$_6$O starting material using other metal compounds, such as zirconium, titanium, magnesium and gallium, for example. The resulting coated B$_6$O powder is sintered at high temperatures (about 1900° C.) and low pressures (about 50 MPa), using a hot press. Firstly, the coated powder is poured into a boron nitride cell, which is then placed inside a graphite die. The sintering is typically carried out under argon or other inert atmosphere.

The resulting material can then be characterised, typically using X-ray diffraction, scanning electron microscopy, optical microscopy and density determination using Archimedes principle. The boron suboxide composite made in this manner is found to have good mechanical properties and a fracture toughness of greater than 2.5 MPa·m$^{0.5}$, and up to about 5 MPa·m$^{0.5}$.

Without wishing to be bound by theory, it is believed that the improved fracture toughness of the boron suboxide composite materials of the invention is due to the effect of the metal at the grain boundaries of the boron suboxide particles during sintering.

It has been found that the fracture toughness of pure sintered B$_6$O is very low. It is well known that borides-based particles typically have a thin B$_2$O$_3$ coat on them. When sintering such particles the B$_2$O$_3$ phase, which is quite weak, remains at the grain boundaries. The presence of such a weak phase at the grain boundaries weakens the material and makes it very easy for a crack to propagate through it. Coating the particles with a M-B—O based phase results in the weak B$_2$O$_3$ being replaced by a much stronger M$_x$B$_y$O$_z$ phase. As a result crack growth by intergranular fracture is now much more difficult.

A secondary reason for the increase in fracture toughness of this material is believed to lie in the fact that the B$_6$O phase and the M$_x$B$_y$O$_z$ phases possess different thermal expansion coefficients and elastic constants. As a result of this difference in properties, when the material is cooled down after sintering, bimetallic stresses are set up between the two different phases. The presence of such stresses, which can be very high, can cause deflections of a propagating crack, thus making said propagation more energetically expensive, thus increasing the material's fracture toughness.

The invention will now be described with reference to the following non-limiting examples.

Example 1

The B$_6$O powder starting material was milled using a planetary ball mill with alumina balls for about four hours. The alumina balls were used as the B$_6$O powder was to be coated with aluminium so alumina as contamination was regarded as being acceptable. The amount of alumina in the milled B$_6$O powder was less than 1%, and was therefore ignored. The introduction of the milling stage helped in breaking down the agglomerates which were present in the powder.

Aluminium powder (5 microns) was admixed with ammonium chloride (NH$_4$Cl) for one and a half hours using a turbular mixer with alumina balls to provide the coating material, the ammonium chloride being used as an activator during coating. As large amounts of aluminium could reduce the B$_6$O during coating, for initial experiments only 20 vol. % of Al and 80 vol. % of NH$_4$Cl were used.

After the first admixing, the milled B$_6$O powder was admixed with the mixture (Al/NH$_4$Cl), using alumina balls for one and a half hours, according to the mass ratio of 4:0.3 (B$_6$O:Al/NH$_4$Cl). The mixture (B$_6$O/Al/NH$_4$Cl) was poured into an alumina boat, and alumina pebbles were placed on top of the mixture to act as inert fillers and capture some of the gases being released in the furnace, which prevents the clogging of the exhaust pipe of the tube furnace. The alumina boat was placed in the tube furnace, and heated up to 1400° C., at a rate of 10° C./min. As the formation of AlCl$_3$ and release of gases occurred at around 350° C., there was a dwelling point of one hour at this temperature. During that period of time, the following reaction took place:

Al(s)+3NH$_4$Cl(s)->AlCl$_3$(s)+3NH$_3$+3/2H$_2$(g)

A second dwelling time of six hours was maintained at 1400° C. in order to allow for a complete coating process, and then followed by cooling, at a rate of 10° C./min. The coated B$_6$O powder contained alumina and some traces of aluminium boride (AlB$_{12}$). It was then placed in a boron nitride cell (inside a graphite die) and sintered using a hot press at a temperature of 1900° C. and a pressure of 50 MPa, under an argon atmosphere, for about 20 minutes.

The boron suboxide composite made in this manner was found to have a hardness of 29 GPa at a load of 5 kg, which compares favourably with that of the prior art. Most importantly, however, the composite material of the invention was found to have a fracture toughness value of about 3 MPa·m$^{0.5}$, which is believed to be greater than any previously reported value for a boron suboxide composite.

Example 2

The conditions of Example 1 were repeated except that this time the mass of Al/NH$_4$Cl mixture was increased. The mass ratio of the mixed powder was 4:0.5 (B$_6$O:Al/NH$_4$Cl). The coating and hot pressing conditions used in Example 1 were used in preparing this sample. The resultant sample was polished and then tested for hardness and fracture toughness with a Vickers indenter, and was found to have a hardness (5 kg load) of about 25 to 28 GPa and a fracture toughness of about 3.5 MPa·m$^{0.5}$.

Example 3

The conditions of Example 1 were repeated except that the mass of Al/NH$_4$Cl mixture was again increased. The mass ratio of the mixed powder was 4:0.75 (B$_6$O:Al/NH$_4$Cl). The coating and hot pressing conditions used in Example 1 were used in preparing this sample. The resultant sample was polished and then tested for hardness and fracture toughness with a Vickers indenter, and was found to have a hardness (5 kg load) of about 24 to 27 GPa and a fracture toughness of 3.5 MPa·m$^{0.5}$.

Example 4

The conditions of Example 1 were repeated and the mass of Al/NH$_4$Cl mixture was once again increased. The mass ratio of the mixed powder was 4:1 (B$_6$O:Al/NH$_4$Cl). The coating and hot pressing conditions used in Example 1 were used in preparing this sample. The resultant sample was polished and then tested for hardness and fracture toughness with a Vickers indenter, and was found to have a hardness (5 kg load) of about 24.5 GPa and a fracture toughness of 4.75 MPa·m$^{0.5}$.

In order to confirm the reproducibility of the results obtained in the above Examples, a new batch of synthesized B$_6$O was coated using the same (coating and hot pressing) conditions as in Example 1. Table 1 below sets out all the results, including the repeated samples. There is a slight difference in properties of some of the hot pressed B$_6$O composites (with same Al content), but that was attributed to the difference in densities, which is also partly connected with surface porosity or decomposition.

The hot pressed B$_6$O composites of the invention had higher fracture toughness figures compared to a hot pressed "pure" B$_6$O material, Comparative Example in Table 1, as a result of strengthening caused by the formation of aluminium borates after sintering.

TABLE 1

| | B$_6$O: Al/NH$_4$Cl (mass in g) | Density (g/cm$^3$) | Hv$_5$ (GPa) | K$_{IC}$ (MPa·m$^{1/2}$) | Phases (after coating) | Phases (after sintering) |
|---|---|---|---|---|---|---|
| Comparative Example | 0 wt % Al (pure B$_6$O) | 2.51 | 30.1 ± 1.2 (1 kg load) | Brittle | B$_6$O | B$_6$O |
| Ex 1 | 4:0.3 | 2.49 | 29.3 ± 0.30 | 2.98 ± 0.16 | B$_6$O | B$_6$O |
| Repeated Sample | | 2.52 | 29.3 ± 0.47 | 2.71 ± 0.43 | Al$_2$O$_3$ Al$_4$B$_2$O$_9$* | Al$_4$B$_2$O$_9$ (2.2 wt % Al) |
| Ex 2 | 4:0.5 | 2.42 | 25.3 ± 0.35 | 3.88 ± 0.23 | B$_6$O | B$_6$O |
| Repeated Sample | | 2.45 | 28.2 ± 1.55 | 3.25 ± 0.96 | Al$_2$O$_3$ Al$_4$B$_2$O$_9$* | Al$_4$B$_2$O$_9$ (3.76 wt % Al) |
| Ex 3 | 4:0.75 | 2.39 | 24.3 ± 0.24 | 4.22 ± 0.30 | B$_6$O | B$_6$O |
| Repeated Sample | | 2.51 | 27.8 ± 1.11 | 3.45 ± 0.12 | Al$_2$O$_3$ Al$_4$B$_2$O$_9$* | Al$_4$B$_2$O$_9$ (5.6 wt % Al) |
| Ex 4 | 4:1 | 2.37 | 24.5 ± 0.78 | 4.75 ± 0.25 | B$_6$O Al$_2$O$_3$ Al$_4$B$_2$O$_9$* | B$_6$O Al$_4$B$_2$O$_9$ |

*Traces of Al$_4$B$_2$O$_9$

REFERENCES

1. H. Hubert, L. Garvie, B. Devouard, P. Buseck, W. Petuskey, P. McMillan, Chemistry of materials, 10, pg 1530-1537, 1998.
2. H. Itoh, I. Maekawa and H. Iwahara, Journal of Material Science Society, Japan, 47, No. 10, pg. 1000-1005, 1998.
3. H. Itoh, R. Yamamoto, and H. Iwahara, Journal of American Ceramic Society, 83, pg. 501-506, 2000.
4. H. Itoh, I. Maekawa and H. Iwahara, Journal of Material Science, 35, pg. 693-698, 2000.
5. R. Sasai, H. Fukatsu, T. Kojima, and H. Itoh, Journal of Material Science, 36, pg. 5339-5343, 2001.

The invention claimed is:

1. A method of producing a boron suboxide composite material includes the steps of providing a source of boron suboxide particles, coating the boron suboxide particles with a metal or metal compound, and sintering the metal coated boron suboxide particles at a temperature and pressure suitable to produce a composite material having a fracture toughness of greater than 2.5 MPa·m$^{0.5}$.

2. A method according to claim 1 wherein the boron suboxide particles are provided in powder form.

3. A method according to claim 1, wherein the boron suboxide particles are coated by chemical vapour deposition.

4. A method according to claim 1, wherein the metal is selected from the group comprising aluminium, zirconium, titanium, magnesium, and gallium, or compounds thereof.

5. A method according to claim 1, wherein the metal is aluminium, or a compound thereof.

6. A method according to claim 1, wherein the sintering of the metal-coated boron suboxide particles is carried out using a hot press at a temperature of greater than 1600° C. and at a pressure of less than 300 MPa.

7. A method according to claim 6, wherein the sintering is carried out at a temperature of 1900° C. and a pressure of 50 MPa.

* * * * *